INVENTOR.
ELMER C. SIMMONS
BY
Philip J. McFarland
ATTORNEY

INVENTOR.
ELMER C. SIMMONS
BY
Philip J. McFarland
ATTORNEY

Dec. 13, 1966 E. C. SIMMONS 3,292,154

DISPLAY APPARATUS

Filed Nov. 29, 1962 7 Sheets-Sheet 3

INVENTOR.
ELMER C. SIMMONS

BY

Philip J. McFarland
ATTORNEY

INVENTOR.
ELMER C. SIMMONS
BY
Philip J McFarland
ATTORNEY

DISPLAY APPARATUS

Filed Nov. 29, 1962 7 Sheets-Sheet 5

INVENTOR.
ELMER C. SIMMONS
BY
Philip J. McFarland
ATTORNEY

INVENTOR.
ELMER C. SIMMONS
BY
[signature]
ATTORNEY

INVENTOR.
ELMER C. SIMMONS
BY
Philip J. McFarland
ATTORNEY

United States Patent Office 3,292,154
Patented Dec. 13, 1966

3,292,154
DISPLAY APPARATUS
Elmer C. Simmons, Whitman, Mass., assignor to Laboratory for Electronics, Inc., Boston, Mass., a corporation of Delaware
Filed Nov. 29, 1962, Ser. No. 241,067
3 Claims. (Cl. 340—172.5)

This invention pertains generally to display apparatus and particularly to apparatus of such type for converting information in the form of electrical signals to characters or symbols on a viewing screen.

It has been known that electrical signals representative of information may be directly converted into visible characters on the viewing screen of a cathode ray tube. For example, U.S. Patent No. 2,920,312, entitled "Magnetic Symbol Generator," teaches how letters, numerals or symbols may be displayed on discrete portions of the viewing screen of a cathode ray tube. My co-pending application, Serial No. 765,973, filed October 8, 1958, now Patent No. 3,130,397, entitled "Display Techniques" (which application is assigned to the same assignee as this application) further teaches how to compose graphical information, as a map, on the viewing screen of a cathode ray tube.

In apparatus according to both the just-cited references, as well as in all other presently known types of apparatus for converting electrical signals to visible symbols on the viewing screen of a cathode ray tube, it is necessary that a "character generator" be used. That is, means must be provided to generate the necessary electric signals every time a symbol is to be formed; i.e. the generating process must be completely recycled every time a symbol is to be formed. According to the two cited references, a character generator comprises a matrix of magnetic cores arranged in columns and rows, means for setting and resetting each core in an ordered sequence in synchronism with the deflection voltages required by a cathode ray tube, and a plurality of output windings (one for each character to be formed) coupled between appropriate ones of the magnetic cores and the beam intensifier electrode of the cathode ray tube. As the individual cores in the matrix are sequentially set and reset, pulses are induced in each one of the output windings. The particular order in which the pulses are induced in each output winding is, of course, different for each desired character and depends on the way in which each output winding is threaded through the magnetic cores of the matrix. Consequently, any desired group of pulses may be selected from among all the groups generated and applied to beam intensifier circuits to form "dots" on the viewing screen of a cathode ray tube. Such "dots" are positioned by the deflection circuits and then visually integrated to present an image of the desired character to an observer.

Since the "dots" for any character are ordinarily formed only once, a "storage" tube must be used to provide more than a transitory display. Even though storage tubes are, however, well known in the art and are quite well adapted to the purpose, the use of such tubes gives rise to some problems. In particular, the use of any known storage tube in a display system materially limits the flexibility of such a system when it is required to permit changes in the characters displayed (whether to "update" or to correct information). The relatively slow-working and complicated auxiliary apparatus which must be incorporated in a system using a storage tube militates strongly against such systems. As a matter of fact, it has been found more feasible simply to erase an entire display from a viewing screen and reform the entire display when it is desired to update or correct portions thereof.

Therefore, it is an object of this invention to provide display apparatus for the direct conversion of electrical signals into visible symbols, or characters, without requiring any sort of character generator.

It is another object of this invention to provide display apparatus which is adapted to the presentation of information for any desired period of time without requiring the use of a "storage" tube.

Still another object of the invention is to provide display apparatus in which any portion of a complete display may be changed without affecting any other portions thereof.

Still another object of the invention is to provide a display system in which control signals indicative of operations desired to be performed on individual symbols or characters may be inserted in stream with the electrical signals representing any individual symbol or character.

Still another object of the invention is to provide display apparatus fulfilling the foregoing objects of the invention using standard and well-known components.

These and other objects of the invention are attained in a preferred display system comprising a magnetic recorder for permanently recording trains of electrical signals (each such train corresponding to a character to be displayed) on a so-called "dictionary" track on the recording medium of such recorder, means for selecting and finally transferring, in any desired order, individual ones of such trains to a so-called "data display" track on the same recording medium, and means for recurrently energizing, in synchronism with a raster formed by appropriate sweep signals applied to the beam deflection electrodes of a cathode ray tube, the beam intensifier electrode of such a tube with the signals on the data display track. The trains of pulses applied to the beam intensifier electrode thus form a pattern of dots which, when integrated by an observer's eye, appear as images of the desired characters in the order in which the trains of pulses were selected from the "dictionary" track.

Since the contemplated system operates on the principle that a selected character may be produced by repetitively "turning-on" the beam of a cathode ray tube in accordance with signals selected from a dictionary track, it is obvious that the proper signals must first be recorded on an appropriate recording medium. Such a recording medium is contained in the magnetic recorder known in the art under the trademark "Bernoulli Disk" and produced by the assignee of this application. Such a recorder is described in detail in U.S. patent application Serial No. 97,987, filed March 21, 1961, now Patent No. 3,208,056, and assigned to the same assignee as the assignee of this application. Briefly, such a recorder comprises a flexible magnetic recording disc, a stabilizing plate disposed adjacent to such disc, a plurality of magnetic transducers supported by the stabilizing plate, means for controlling the fluid pressure gradient between the disc and the stabilizing plate, and means for rotating the flexible magnetic recording disc. Once an equilibrium of the dynamic, elastic and fluid forces acting on the flexible magnetic recording disc is established, the disc is constrained to assume the shape of a surface of revolution a small distance from the stabilizing plate. The exact distance of the flexible magnetic recording disc from the stabilizing plate may then be adjusted, as by varying the size of an aperture in the stabilizing plate. Obviously, the position of each magnetic transducer supported by the stabilizing plate may be so chosen that a plurality of "tracks" may be recorded with a fixed predetermined spatial relationship between the various ones of the transducers. It follows then that, since the magnetic recording disc may easily be driven at a substantially constant speed, as by a synchronous motor, a predetermined temporal relationship between the signals recorded (or read) by various ones of the transducers may be thus attained. Further, fine adjustment of such spatial and temporal relationships may be easily effected, as required, by simply rotating individual transducers with respect to each other.

It should be noted here however, that the "Bernoulli Disk" recorder is best adapted to the so-called "Ferranti" system of recording while the generation and detection of signals for application to the beam intensifier electrode of a cathode ray tube is most easily and satisfactorily accomplished if the so-called "NRZ" system of recording is used. Consequently, as will become clear hereinafter, signals are converted back and forth from Ferranti to NRZ forms as required in the preferred embodiment of the invention.

While the just-described "Bernoulli Disk" magnetic recorder is very well adapted to the contemplated system, it is not essential. Any "closed loop" recorder, as a drum type recorder, may be used. It is necessary for proper operation of the preferred embodiment of my system only that the chosen recorder be adapted to produce:

(a) An "index" track, meaning a closed track on which a signal indicating a reference point on the recording medium may be recorded. In a practical case the signal on such a track would consist of a single "1" (the index mark or pulse and a number, say 2047, of "0's");

(b) A "clock" track, meaning a closed track on which a signal indicating angular increments from the index mark may be recorded so that the position of each element of all the recorded signals on all the other tracks may be determined and equally spaced synchronizing signals may be derived so that operation of all elements in the system may be properly synchronized. In a practical case, if any one of 64 of "32 bit" characters is to be displayed in a 5 x 5 matrix, the signal on the clock track would consist of 2048 consecutively recorded "1's" starting and ending at the index mark on the index track;

(c) A "dictionary" track, meaning a closed track on which signal trains may be permanently stored, each of such trains occupying a portion of a known sector of the dictionary track. In a practical case, if selection of the characters to be displayed is to be from a lexicon of 64 characters, each individual signal train would occupy a portion of a sector constituting $1/64$ of the track. Each such train, as will become clear hereinafter, would consist of an appropriately ordered series of "1's" and "0's," each "1" or "0" being associated with a single clock pulse;

(d) A "register" track, meaning a closed track which any selected signal train on the dictionary track may be transferred and repetitively recorded along with any desired control signals; and (e) A "data display" track, meaning a closed track to which any possible permutation of signal trains recorded on the dictionary track may be transferred, the transfer of each signal train being effected by way of the register track, whereby the signal trains finally recorded on the data display track are in any desired order and any control signal inserted in the register track is also recorded.

It should be noted also that the address of each signal train on the dictionary track is determined by counting clock pulses, starting with the clock pulse coincident with the index pulse on the index track. Thus, if a binary counter operating from a reading head adjacent to the clock track is so arranged as to produce an output signal for every 32 clock pulses, then 64 such signals, each corresponding to rotation of the recording medium through an angular increment of 360°/64 from the index pulse, will be derived. These 64 signals may then be fed into a binary register (referred to hereinafter as the "disc position register") to produce a changing binary signal representative of the address of consecutively stored signal trains on the dictionary track. Selection of a desired address may then be accomplished by the well known technique of comparing the changing binary signal with a fixed binary signal representing a desired address and producing a selection signal during that portion of a revolution of the recording medium in which the two signals are the same.

The same general method may be used to determine the order in which signal trains selected from the dictionary track are to be displayed on the raster. That is, if the changing binary signal of the disc position register is compared with a binary signal representing the number of times the selection signal mentioned above has been generated, then the writing head associated with the data display track will be energized at an appropriate time to allow any desired permutation of signal trains to be recorded on such track.

For a more complete understanding of the invention reference is now made to the following detailed description and to the drawings, in which:

FIG. 1 is a block diagram showing a way in which signal trains representing various characters may be recorded on a dictionary track of a closed loop magnetic recorder;

FIGS. 2(*a*) through 2(*s*) are simplified representations of the waveforms existing at various points in the block diagram shown in FIG. 1 when a signal train is being recorded on a dictionary track;

FIG. 3 is a block diagram of a preferred embodiment of the display system contemplated by the invention;

FIG. 4(*a*) through FIG. 4(*v*) are simplified representations of the waveforms existing at various points in the block diagram shown in FIG. 3 when two signal trains are successively transferred from a dictionary track to a display track and then applied to a cathode ray tube along with deflection and cursor signals;

Before considering the drawings in detail it should be realized that the various figures have been drawn so as to illustrate my inventive concepts more clearly and that a production model of display apparatus would undoubtedly be more sophisticated than the one illustrated and described. For example, the elementary "four-character, five-bit" system selected for illustration and explanation of my inventive concepts would hardly be satisfactory in a practical case, even though such a system is quite adequate to show my inventive concepts.

Figure 1:
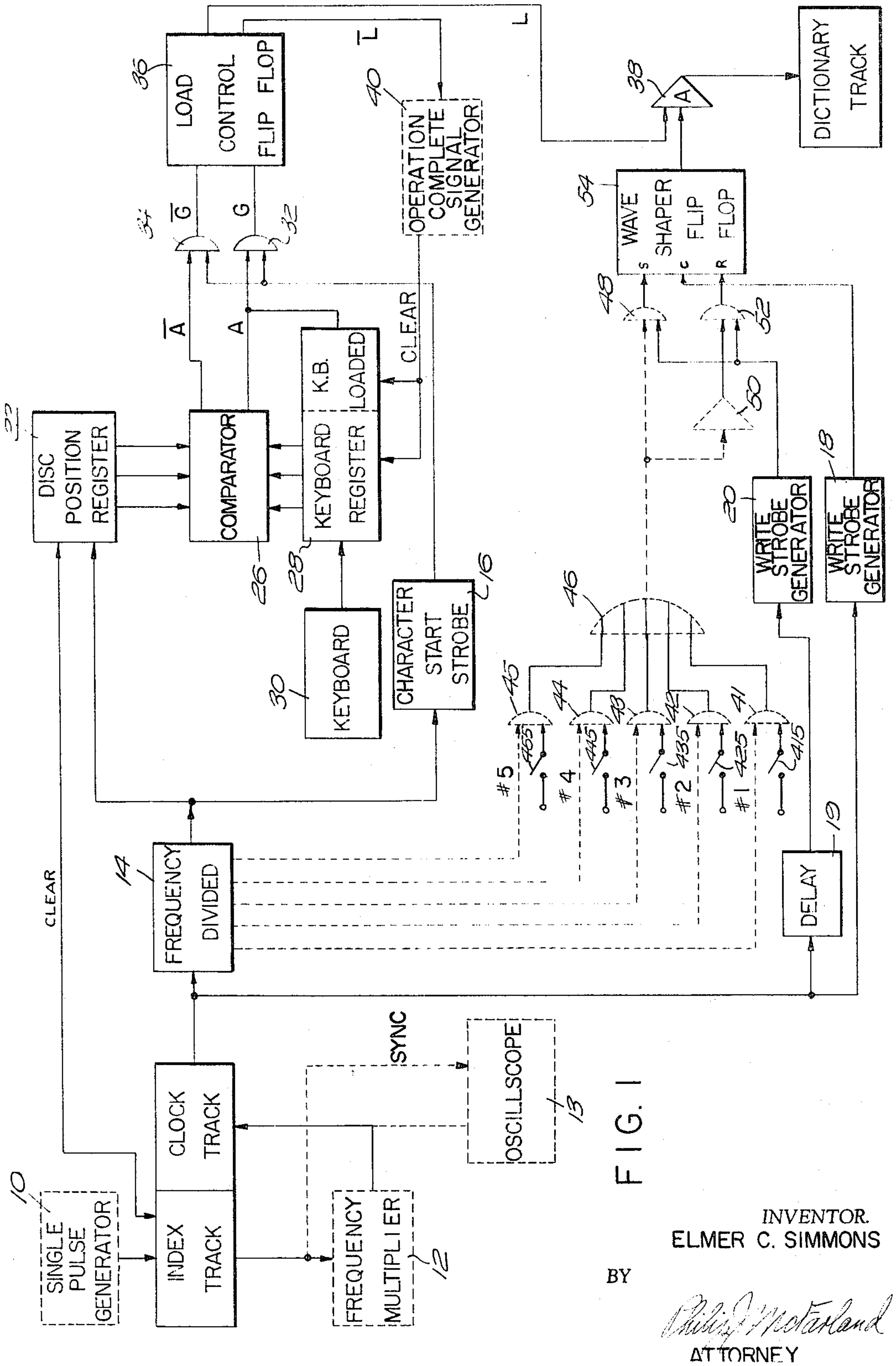
Figure 2:
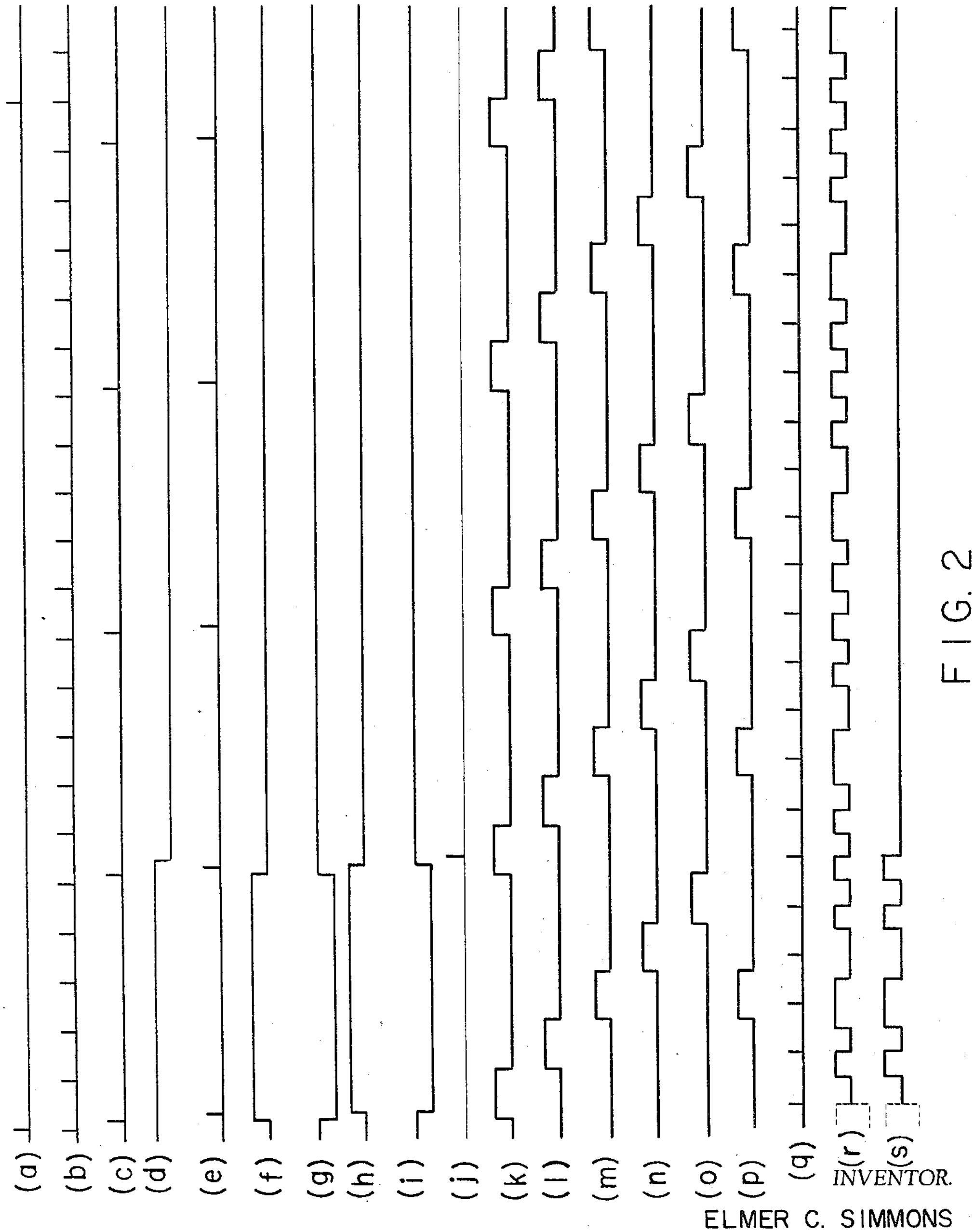

Referring now to FIGS. 1 and 2, the operation of apparatus for recording the index, clock and dictionary tracks may be seen. It should, however, be noted here that the elements shown in broken lines in FIG. 1 are auxiliary equipment not used after the dictionary track is once written. Such equipment is shown only for convenience of explanation and, as will become obvious, need not be limited to the illustrated form. A single pulse generator 10, comprising any known monostable multivibrator, is connected to a magnetic transducer (not shown) adjacent to the recording medium in a closed-loop magnetic recorder, as the "Bernoulli Disk" recorder mentioned hereinbefore. Thus, assuming that the recorder is operating and the recording medium therein is rotating at a substantially constant speed, a single pulse will be recorded on the recording medium, the position of such pulse being determined by the single pulse generator 10. The recorded pulse is the index pulse, or mark, and is recorded as a Ferranti "one." The transducer used to record the index pulse is then connected as a reading transducer, thereby producing pulses at a frequency corresponding to the frequency of rotation of the recording medium. The pulses so produced are fed into a known variable frequency multiplier 12. In the illustrated example, since a four-character five-bit dictionary system is illustrated, the frequency of the pulses on the index track is multiplied by 20. The output of the frequency multiplier 12 is led to a magnetic transducer (not shown) which records the output of the frequency multiplier 12 on a clock track on the recording medium. The frequency multiplier 12 may be known free running multivibrator synchronized by the index pulse and having an adjustable period so that exactly 20 cycles are, in the illustrated case, recorded on the clock track for each revolution of the magnetic recorder. An oscilloscope 13, synchronized as shown, may be used to adjust the period of the frequency multiplier 12. Obviously, such observational techniques may be modified as desired to permit any multiplication of the index track signal by any integer, as 2048, to provide any desired integral number of clock pulses. The signal recorded on the clock track, which is an integral number (here 20) of Ferranti "ones," is read by a magnetic transducer (not shown) and fed into a frequency divider 14, a write strobe generator 18 and, through a delay element 19, to a write strobe generator 20. The latter three elements just mentioned will be described hereinafter. The frequency divider 14 is a binary counter consisting of standard cascaded flip-flops which divide the clock track output, in this case by 5, to produce a high level signal. In other words, the signal output level of frequency divider 14 is raised after each 5 pulses recorded on the clock track. Obviously, again any desired division may be effected by the frequency divider 14. In the practical case mentioned hereinbefore, division is by 32. The output of the frequency divider 14 is led to a character start strobe generator 16, a disc position register 22 and to a character start strobe generator 24. The disc position register 22 is also controlled by a clear line actuated by the reading transducer (not shown) actuated by the index pulse. The disc position register 22 is a standard binary counter adapted to count, in the illustrated case, to 4. Each stage of the disc position register 22 is fed into a comparator 26 which may be any known binary comparator. The second input to the comparator 26 is derived from a keyboard register 28 which is similar to the disc position register 22, except that the state of each of its stages is set by a keyboard 30 and there is one additional stage (referred to hereinafter as the keyboard register loaded stage) in the keyboard register 28. The keyboard register loaded stage produces a high level signal when the keyboard 30 is actuated and all the stages of the keyboard register 28 are set. The comparator 26 comprises a number of "and" gates to produce a normal output signal designated "A" when the binary number in the disc position register 22 equals the binary number set into the keyboard register 28 by actuation of the keyboard 30. In addition the comparator 26 produces the complement of the "A" signal, designated "$\overline{A}$," as by passing the "A" signal through an inverter (not shown).

The character start strobe generator 16 is a monostable multivibrator having an adjustable period less than the period of the output of the frequency divider 14. Consequently, the output of the character start strobe generator 16 may be formed, as by a differentiator, to produce a pulse delayed any desired amount with respect to the output of the frequency divider 14. An "and" gate 32 is energized so as to pass a signal, designated "G," when there is coincidence in the signal "A," a high level signal from the keyboard register loaded stage of the keyboard register 28 and a character start strobe signal. An "and" gate 34, which is complementary to "and" gate 32, passes a signal when there is coincidence between the signal "$\overline{A}$" and the character start strobe signal. The signals "G" and "$\overline{G}$" out of the "and" gates 32, 34 are fed into appropriate terminals of a load control flip-flop 36, which is a known bistable multivibrator, so as to cause the latter to change its state at a particular point during rotation of the recorder (when a signal passes through gate 32) and to maintain its changed state for a predetermined time thereafter (until a signal passes through gate 34). The normal output of the load control flip-flop 36, designated "L," is led to a gated amplifier 38 to enable that amplifier. The complementary output of the load control flip-flop, designated "$\overline{L}$," is led to an operation complete signal generator 40, which generator may be a monostable multivibrator, to produce a clear pulse which clears all the stages of the keyboard register 28, as shown. As a result, then, the gated amplifier 38 is enabled for but one selected period during a single revolution of the recording medium after the keyboard 30 is actuated.

At the time the gated amplifier 38 is enabled, a particular signal train is recorded on the dictionary track by a transducer (not shown). If, for example, a five bit character, such as 00100, is to represent a character, then the frequency divider 14 is tapped at appropriate interstage points so that five signals (designated as #1, #2, #3, #4 and #5) are successively and repetitively derived between each count on the disc position register 22. Each of these signals is lead to a separate "and" gate 41, 42, 43, 44, 45, as shown. Each gate 41, 42, 43, 44, 45 is also connected through a switch 41*s*, 42*s*, 43*s*, 44*s*, 45*s* to a source of D.C. potential (not shown). Consequently, since the lines marked #1, #2, #3, #4, #5 are connected to respective interstage points of the frequency divider 14, such lines will be energized sequentially at equal intervals between output signals from the frequency divider 14. In other words the "and" gates 41, 42, 43, 44, 45 will be enabled sequentially by the frequency divider 14 in synchronism with the clock pulses. The position of the switches 41*s*, 42*s*, 43*s*, 44*s*, 45*s* determine the output level of the signal from the "and" gates 41, 42, 43, 44, 45. Thus, in the illustrated case, the output signal level of "and" gates 41, 42, 44, 45 is always low and the output signal level of "and" gate 43 is high when that gate is enabled. All the just-mentioned signals are passed to an "or" gate 46. In passing it should be noted that, in a practical case where a 32 bit character is formed, 32 switches would be used in place of the five just described, the 6th, 12th, 18th, 24th, 30th, 31st and 32nd of such switches being open at all times). Thus, if a high level signal represents a "1" and a low level signal represents a "0," the signal out of the "or" gate 46 is, in NRZ form, 00100. This signal is led to an "and" gate 48 and an inverter 50. The output of the inverter 50 in turn is passed to an "and" gate 52. "And" gates 48, 52 are first strobed by the output of write strobe generator 18 and their resulting output signals are connected to a wave shaper flip flop 54. The output of write strobe generator 20 (which output is here assumed to be delayed by one half the time between strobe pulses from write strobe generator 18) is connected to toggle the wave shaper flip flop 54. The output of the wave shaper flip flop 54 (which here is the signal 00100 in Ferranti form, synchronized by means of the write strobe generators 18, 20 with the clock pulses, but delayed by a period equal to one half the period between clock pulses from the NRZ signal out of "or" gate 46) in turn is connected to the input of the gated amplifier 38.

The fact that the Ferranti signal into the gated amplifier 38 is delayed by one half a period between clock pulses (or one half a bit) causes no difficulty in view of the fact that the position of the output pulse of character start strobe generator 16 may be adjusted. That is, the position of the output signal of the load control flip flop 36, designated "L," may be adjusted so as to bracket the Ferranti waveform into the gated amplifier 38 by adjusting the position of the character start strobe pulses out of the character start strobe generator 16, thereby avoiding loss of any information due to the phase shift resulting from the conversion of an NRZ signal to a Ferranti signal.

Referring now to FIG. 2, the pertinent waveforms of the various elements which combine to produce a gate (FIG. 2(*h*)) and a signal to be recorded on the dictionary track (FIG. 2(*s*)) are shown. Before considering the figure in detail, however, it should be noted certain waveforms which are substantially similar have not been shown separately. That is, for example, FIG. 2(*h*) represents the input waveform to the load control flip-flop 36 as well as the input wave form to the gated amplifier 38, even though the output of the load control flip flop 36 is, of course, delayed a small amount from its input. With the foregoing in mind, it may be seen that FIG. 2(*a*) represents the output of the index track which operates as a clear pulse for the disc position register 22. The waveform of FIG. 2(*a*) is a pulse occurring each time the recording medium rotates through 360 degrees. Consequently, the disc position register 22 may count consecutive inputs from the frequency divider 14 during a single revolution of the recording medium. FIG. 2(*b*) represents the output of the clock track. In the case illustrated and described in FIG. 1, there are 20 such pulses between each index pulse. FIG. 2(*c*) represents the output of the frequency divider 14 shown in full line in FIG. 1. Since frequency divider 14 is a binary counter consisting of a plurality of cascaded flip flops, its output is slightly delayed from its input. Further, since in the illustrated case, it has been assumed that there are 4, 5 bit characters there are 4 output pulses from frequency divider 14 in one revolution of the recording medium. FIG. 2(*d*) represents the output of the keyboard loaded stage of the keyboard register 28, it being assumed that the keyboard 30 has been actuated to load the keyboard register 28. FIG. 2(*e*) represents the output of the character start strobe generator 16. As indicated by the double headed arrow adjacent to the left hand side of FIG. 2(*e*) the time of occurrence of this output is variable. Since the character start strobe generator 16 is energized by the output of the frequency divider 14, there are 4 output pulses from the character start strobe generator 16 during one revolution of the recording medium. FIG. 2(*f*) represents the normal output of the comparator 26 designated "A" in FIG. 1 when the first character is to be written on the dictionary track. FIG. 2(*g*) represents the complementary output of comparator 26, designated "$\bar{A}$." FIGS. 2(*h*) and 2(*i*) represent respectively the outputs of the "and" gates 32, 34. In addition FIGS. 2(*h*) and 2(*i*) represent, as noted above, the normal and complementary outputs of the load control flip flop 36. It should be noted that the beginning of the gate shown in FIG. 2(*h*) occurs only when the following conditions are met:

(1) The curve of FIG. 2(*d*) is at a high level, i.e. when the keyboard register is loaded;

(2) The curve of FIG. 2(*f*) is at a high level, i.e. when the count in the disc position register 22 equals the count in the keyboard register 28; and (3) A character start strobe pulse, as shown in FIG. 2(*e*), occurs simultaneously. Similarly, the complementary gates out of the load control flip flop 36 is returned to its high level when the complementary output of the comparator 26 is at a high level (indicating mismatch of the disc position register 22 and the keyboard register 28) and the next following character start strobe pulse exists simultaneously.

FIG. 2(*j*) represents the output of the operation complete signal generator 40. This is a single pulse which occurs when the complementary output of the load control flip flop 36 returns to its higher value and, as shown, operates to clear the keyboard register 28 and the keyboard loaded stage therein (see FIG. 2(*d*)). Consequently, until such time as the keyboard register 28 is again loaded by actuation of the keyboard 30 all the conditions necessary for operation of the load control flip flop 36 cannot be attained and therefore the gate for the gated amplifier 38 shown in FIG. 2(*h*) will occur but once, no matter how many times the recording medium rotates.

FIGS. 2(*k*) through 2(*o*) represent the signals into the "and" gates 41 through 45 which are derived from interstage points in the frequency divider 14 as shown by the dotted lines in FIG. 1. In effect, the "and" gates through 41–45 operate as a commutator sampling the state of individual stages in the frequency divider 14 for equal intervals between output pulses therefrom. Consequently, if the switches **41*s* through 45*s* are positioned so as to enable a particular configuration of the "and" gates 41–45** (as, for example, to represent the digit 00100), an output, as shown in FIG. 2(*p*) is obtained from the "or" gate 46. It is noted here that should one or more of switches **41*s* through 45*s* be left open, say switch 45*s***, while forming all the various signals for the dictionary track, then the last bit, or bits recorded on such track will always be a "0." In effect, this means that a gap will exist between successive signal trains on the dictionary track. As will be shown hereinafter, such an effective gap may be utilized to record control signals designating operations to be performed on or by a recorded signal train.

FIG. 2(*q*) represents the output of the write strobe generator 20 by proper adjustment of the delay element 19. These output pulses may, for reasons given hereinafter, be made to occur half way between output pulses from the write strobe generator 18, as shown in FIG. 2(*b*). The strobe pulses from the write strobe generator 20 are used to sample the waveform out of the "or" gate 46 shown in FIG. 2(*p*) and the pulses shown in FIG. 2(*b*) are used to toggle the wave shaper flip flop 54 thus producing the waveform shown in FIG. 2(*r*). The repetitive waveform shown in FIG. 2(*r*) is impressed on the gated amplifier 38. Since, however, the gated amplifier 38 is enabled but once by the output of the load control flip flop 36 the curve, shown in FIG. 2(*s*) appears at the output of the gated amplifier 38. It should be noted here that the waveform shown in FIG. 2(*p*) is in NRZ form and that the waveforms shown in FIGS. 2(*r*) and 2(*s*) are in Ferranti form, and that the waveforms shown in FIGS. 2(*r*) and 2(*s*) are delayed from the waveform shown in FIG. 2(*p*) by a time equal to one half the period between clock pulses, as shown in FIG. 2(*b*).

Figure 3:
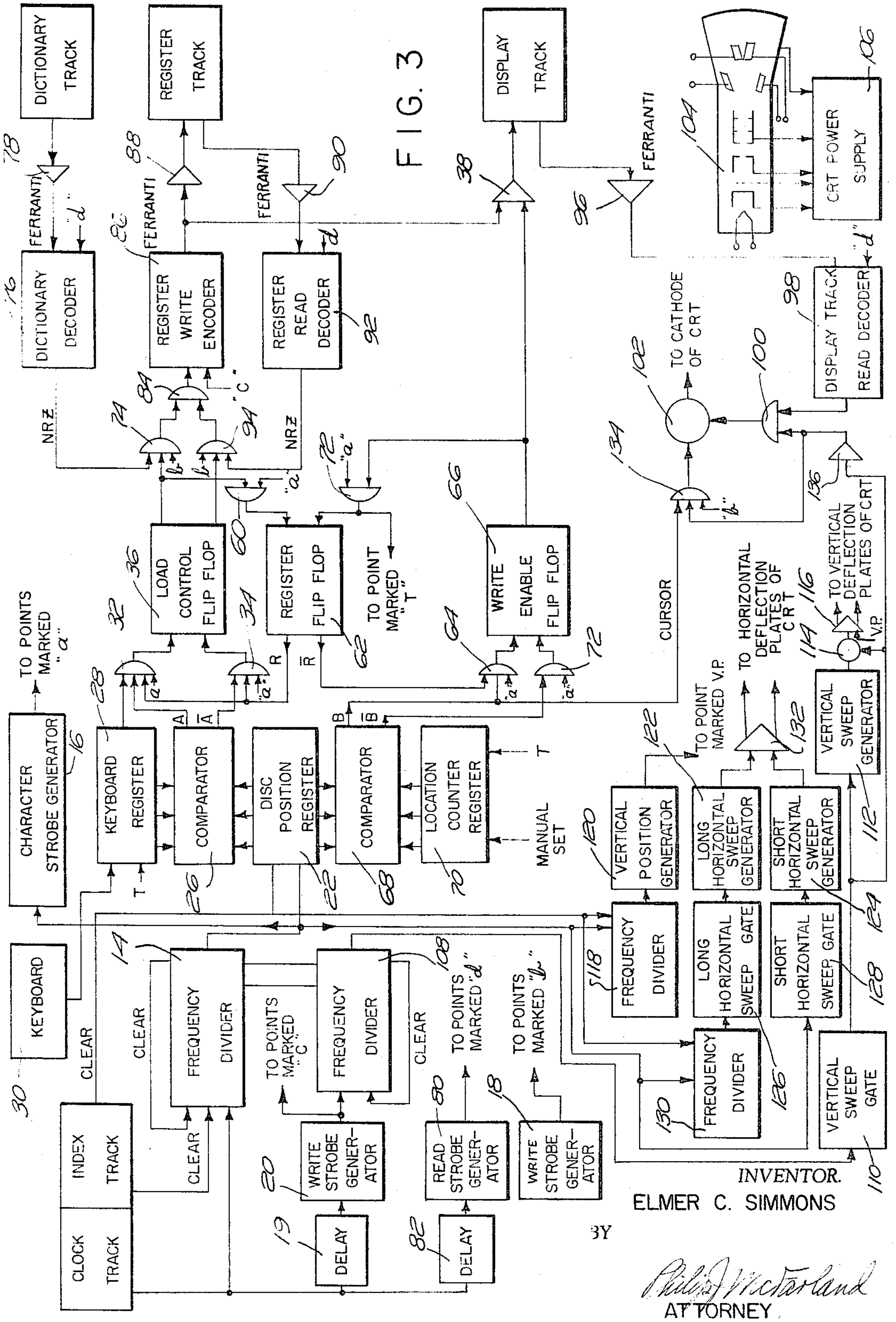

Referring now to FIG. 3 it may be seen that the frequency divider 14, the character start strobe generator 16, the write strobe generators 18, 20, the disc position register 22, the comparator 26, the keyboard register 28 and the keyboard 30 are the same as the correspondingly numbered elements illustrated and described in connection with FIG. 1. The "and" gates 32, 34 are, however, shown, respectively, as a four-legged gate and a three-legged gate in FIG. 3, thus differing from the gates shown in FIG. 1. The extra input to the gates shown in FIG. 3 is an enabling signal which will be decsribed in more detail hereinafter. Load control flip flop 36 in FIG. 3 is identical with the similar element shown in FIG. 1. The output of the load control flip flop in FIG. 3 is, however, taken to a different place than the output of the load control flip flop shown in FIG. 1. The normal output of the load control flip flop 36 is led to an "and" gate 60 to enable that gate when the load control flip flop 36 changes state upon coincidence of the signals through the "and" gate 32. A second input signal to the "and" gate 60, which input is designated "*a*" is taken from the output of the character start strobe generator 16. Thus, when the gate 60 is enabled, the next following character start strobe pulse is passed through "and" gate 60 to a register control flip flop 62. The normal output of the register control flip flop 62, designated "R," is led to gates 32, 34 to provide the extra input to gates 32, 34 as mentioned above. The complementary output of the register control flip flop 62, designated "R," is led to an "and" gate 64. It may be seen, therefore, that an enabling signal is applied to the "and" gates 32, 34 during the period of normal output of the register control flip flop 62 and the gate 64 is, during that same period disabled. Such operation positively prevents transfer of signals directly from the dictionary track to the data display track. Upon completion of a cycle of operation of a write enabling flip flop 66 the "and" gate 64 may be enabled by the normal output of a comparator 68, designated by the letter "B." The comparator 68 which is similar to comparator 26, generates its normal output when there is coincidence between the state of the various stages of the disc position register 22 and the corresponding stage of a location counter register 70. The enabling signals on the gate 64, therefore, are the complementary signal from the register control flip flop 62 and the normal output of the comparator 68 so that when coincidence between those two signals exist the next following character start strobe pulse designated "*a*" passes through the "and" gate 64 to trigger the write enabling flop flop 66. The complementary output of the comparator 68 is led to an "and" gate 72 to enable that gate so that the next following character start strobe pulse, designated "*a*," passes through the "and" gate 72 to return the write enabling flip flop 66 to its initial state. Consequently, the output of the write enabling flip flop may seem to be a gate occurring after the load control flip flop 36 has cycled so as to permit the register control flip flop 62 to cycle and the counts on the disc position register 22 and the location counter register 70 are identical. This gate then is impressed on the gated amplifier 38 to enable that element at any time except when a signal train is being read out of the dictionary track. The output of the write enabling flip flop is also led to an "and" gate 72 so as to enable the latter element. Consequently when the next following character start strobe pulse designated "*a*" is impressed on the gate 72 it is passed through that gate to return the register control flip flop 62 to its initial state. The output of the "and" gate 72 is also led to the keyboard register 28 and to the location counter register 70 to the points marked "T" on those two elements to clear the count from both in preparation for the insertion of a new character and to prevent reading a signal train out of the dictionary track more than once. The normal output of the load control flip flop 36 is also led to an "and" gate 74 to enable that element. The output of a dictionary decoder 76, which is fed by an amplifier 78 operating off a magnetic transducer (not shown) reading the signal recorded on the dictionary track of the recorder, is also fed into the "and" gate 74. Since the output of the amplifier 78 is in Ferranti form, and since it is necessary, if proper operating conditions are to be maintained, to convert such a signal to its NRZ form the dictionary decoder 76 may be simply a flip flop adapted to be toggled by a strobe pulse such as designated by the letter "*d*." Such a pulse is, as shown, available from the output of a read strobe generator 80 operating through a delay element 82 off the clock track. The NRZ waveform out of the dictionary decoder 76 is sampled at the "and" gate 74 by the strobe pulses marked "*b*." The output of the "and" gate 74 is passed to an "or" gate 84 and thence through a register write encoder 86 to an amplifier 88 to a magnetic transducer (not shown) to record, in Ferranti form, the signal train passing through the "and" gate 74. In other words, when the state of the load control flip flop 36 indicates that a particular sector of the dictionary track which contains a desired signal train is under the dictionary reading transducer, that waveform is read out of the dictionary track and transferred to the register track. The register write encoder 86 is a flip flop toggled by a signal designated "*c*" from the write strobe generator 20 so that the signal impressed on the magnetic transducer at the register writing transducer of the writing track is again in Ferranti form. As soon as a signal train is written on the register track it is read by a reading transducer (not shown) and led through an amplifier 90 through a register read track decoder 92 to an "and" gate 94. The register read track decoder 92 is identical with the dictionary decoder 76 already described. The "and" gate 94 is enabled by the complementary signal out of the load control flip flop 36 and is strobed by the same signal as strobes the "and" gate 74. Thus, when the state of the load control flip flop 36 is such that there is no coincidence between the state of the keyboard register 28 and the disc position register 22, "and" gate 94 permits signals read from the register track to pass through it, "or" gate 84, the register write encoder 86, the amplifier 88 and back to the writing transducer on the register track. It is obvious that, at any instant in time, signals may pass through either gate 74 or gate 94 but not through both simultaneously. That is, a signal is read out of the dictionary track but once, written on the register track and then recycled until the register track is finally filled after one revolution of the recording medium. The recirculating signal out of the register write encoder 86 is also led to the gated amplifier 38. It will be noted here in passing that the delays resulting from conversion of Ferranti forms to NRZ and vice versa are of no consequence, since compensation for such delays may be easily made. The delay resulting when the Ferranti waveform out of the dictionary track is passed through the dictionary decoder 76 is compensated by adjustment of the character start strobe generator 16 so as to finally cause the load control flip flop 36 to generate its gate at the proper time with respect to the pulse train out of the dictionary decoder 76. The delays encountered in the waveform conversion in the register track loop are compensated by adjusting the position of the register track read transducer with respect to the register track writing transducer. With this in mind, a moment's thought will make it clear that the beginning of the gate generated by the write enabling flip flop 66 may be made to be coincident with the beginning of a signal train out of the register write encoder 86. It should also be noted that it is a simple matter to adjust the various write strobe generators and the read strobe generator so as to provide properly phased signals output therefrom to accomplish the necessary conversion and sampling. For example, the write strobe generator 18 and the write strobe generator 20 together with its delay element 19 need not be separate elements as shown in the drawing, but may be a single reading transducer reading the Ferranti signal on the clock track with appropriate circuitry. Thus any known circuit for detecting positive going portions of the signal on the clock track and any known circuit for detecting negative going signals on the clock track may be fed in parallel to produce pulse outputs. Consequently, since the clock track consists of consecutive Ferranti ones, the outputs of the write strobe generators 18, 20 being interlaced. Read strobe generator 80 is, preferably, a second transducer reading the clock track signal. Thus, by adjusting the spacing between such second transducer and the first reading transducer adjacent to the clock track, the output of the second transducer may be phased as desired with the output of the first reading transducer so as to delay, as desired, the output of the read strobe generator 80 with respect to the write strobe pulses. The signal recorded on the display track is read by a transducer (not shown), which transducer may be the same as the one used to record the signal on the display track, then passed through an amplifier 96 to a display track read decoder 98 to be converted from Ferranti to NRZ form, and then through an "and" gate 100, a buffer amplifier 102 and to the beam intensifier electrode of a cathode ray tube 104. In the illustrated case the beam intensifier electrode of the cathode ray tube 104 is the cathode thereof. The cathode ray tube is of a standard type, as schematically illustrated at the lower right hand side of FIG. 3. That is, the cathode ray tube 104 has a heater, a cathode electrode, a control grid electrode, a first accelerating electrode, a focusing electrode, horizontal and vertical deflection plates, a final acceleration electrode, and a viewing screen energized. An appropriate power supply 106 is provided to energize the various electrodes, as shown. The material of the viewing screen of the cathode ray tube 104 may be selected from among any of the fast or medium phosphors known in the art. That is, if full advantage of the invention is to be taken, the viewing screen of the cathode ray tube 104 should be selected from any of the phosphors of the type designated P–1 to P–7.

The deflection control circuits for the vertical deflection circuits and the horizontal deflection circuits synchronize the raster on the viewing screen with the signal trains applied to the cathode of the cathode ray tube 104. The vertical sweep circuits are controlled by a frequency divider 108 (here a monostable multivibrator) operating off the write strobe generator 20. The exact division accomplished by frequency divider 108 is, in a practical case, dependent upon the number of bits of information desired per vertical sweep in the generation of a single character. Since, however, it is highly desirable that there be spaces provided between individual characters on the viewing screen the output of the frequency divider 108 be inhibited periodically. Further, it is desirable that cursor signals described hereinafter not coincide with displayed characters. The desired inhibition may be accomplished by appropriate connection, as shown in FIG. 3, between interstage points on the frequency divider 14. The output of the frequency divider 108 is fed into a vertical sweep gate generator 110 and thence into a vertical sweep generator 112. As shown, the vertical sweep gate generator 110 may be a monostable multivibrator and the vertical sweep generator 112 may be a simple RC sweep circuit gated by the vertical sweep gate. The output of the vertical sweep gate generator 110 and the output of the vertical sweep generator 112 are, additionally, summed in a summing amplifier 114. The output of the summing amplifier 114 is led, through a differential amplifier 116, to a vertical deflection electrode of the cathode ray tube 104. Since it is desired, in the illustrated case, to provide two lines of characters for display, the output of the frequency divider 14 is led into a frequency divider 118 (which divider is adjusted so as to divide the number of pulses out of the frequency divider 14 by the number of lines desired for display) the output of which controls a vertical position generator 120, here a flip flop. The output of the vertical position generator 120 is fed through the second input of the differential amplifier 116, to a vertical deflection electrode of the cathode ray tube 104. It may be seen, therefore, that the vertical deflecion electrodes of the cathode ray tube 104 are energized in push-pull, thus minimizing the non-linearity of the sweep voltages applied thereto. It may also be seen that, between sweep intervals, a negative pedestal is applied to the vertical deflection electrodes.

The horizontal sweep impressed on the cathode ray tube 104 is derived from a long horizontal sweep generator 122 and a short horizontal sweep generator 124. These elements are gated, respectively, by a long horizontal sweep gate generator 126 and a short horizontal sweep gate generator 128. The short horizontal sweep gate generator 128 is a monostable multivibrator set by the output of the frequency divider 14. In a practical case, adjustment of the period of the short horizontal sweep gate generator 128 is adjused so as to be slightly shorter than the period between pulses out of the frequency divider 14. The long horizontal sweep gate generator 126 is energized by a frequency divider 130 which is set to divide the output pulses from the frequency divider 14 by a number equal to the number of characters desired to be displayed on a single line on the viewing screen of the cathode ray tube 104. (It should be noted here in passing that, in a practical case, frequency divider 118 and frequency divider 130 may easily be eliminated. That is, appropriate points in the disc position register 22 may be tapped to obtain the desired division of the output pulses of the frequency divider 14.) The long and short horizontal sweep generators 122, 124 may (as in the case of the vertical sweep generator 112) be simple RC sweep circuits gated by their respective gates. It is necessary only that the slope of the two sweeps differ. The outputs of the long horizontal sweep generator 122 and the short horizontal sweep generator 124 are fed, through a differential amplifier 132, the horizontal deflection plates of the cathode ray tube 104. Since, as may be seen, the horizontal deflection electrodes are driven in push-pull, the linearity of the individual sweep voltages is not critical.

The cursor pulses for the display on the viewing screen of the cathode ray tube 104 are derived when there is coincidence between the normal output of the comparator 68, inverted vertical sweep gate and a strobe pulse out of the write strobe generator 18. Thus, the normal output line of the comparator 68 and the output of the vertical sweep gate generator 110 after inversion in an inverter 136, enable an "and" gate 134. Consequently, strobe pulses from write strobe generator 18 occurring during any period of coincidence are passed through the "and" gate 134 to the buffer amplifier 102 and thence to the beam intensifying electrode of the cathode ray tube. In order to avoid the possibility of mixing data signals with cursor signals on the beam intensifying electrode of the cathode ray tube 104, the output of the vertical sweep gate generator 110 is led to the "and" gate 100.

Figure 4:
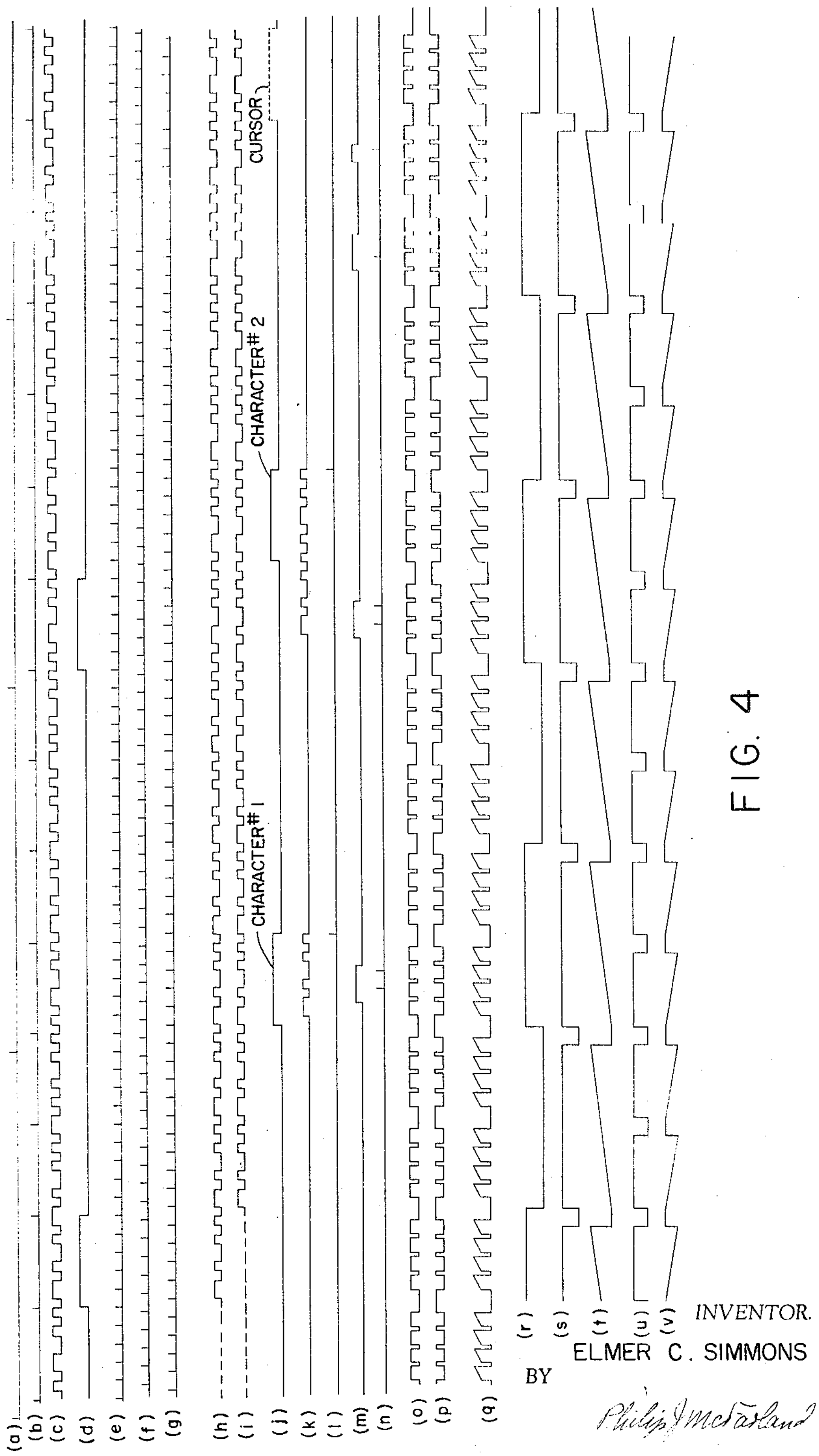

Before considering FIG. 4 in detail it should be noted that many simplifications and assumptions have been made in order that the explanation may be made clear. For example, it has been assumed that there are but 4 characters which may be written on the viewing screen of a cathode ray tube. (These characters being represented, respectively, by the binary numbers 00100, 01100, 11000, and 11100 recorded in Ferranti form on a dictionary track as shown in FIG. 4(*c*).) Further, it should be noted that there are but 4 vertical sweeps per character, corresponding to the first 4 digits of binary number representing each character. It has also been assumed that the characters are displayed on either one of two lines on the viewing screen of the cathode ray tube 104.

Referring now to FIG. 4, FIG. 4(*a*) represents the output pulse of the transducer reading the signal recorded on the index track. There is one such pulse per revolution of the recording medium. FIG. 4(*b*) represents the output of the character start strobe generator 16. There are, in the illustrated example, 4 such pulses per revolution of the recording medium. It will be noted here in passing that the character start strobe pulses of FIG. 4 are differently phased with respect to the index pulse than the pulses shown in the corresponding curves of FIG. 2(*a*) and FIG. 2(*b*). Such difference is required in order to compensate for the delay resulting from writing a Ferranti waveform on the display track and then reading the so-written waveform and converting it to NRZ form with a single transducer. Such compensation is easily obtained by adjusting the delay of the character start strobe generator 24 after the dictionary track is written.

FIG. 4(*c*) represents the Ferranti waveform recorded on the dictionary track, the waveform on FIG. 4(*c*) between each of the character start strobe pulses shown on FIG. 4(*b*) being indicative respectively of one of the binary digits listed above.

It is assumed that it is desired to first transfer character 2 from the dictionary track to the display track and then to transfer character number one from the dictionary track to the display track. FIG. 4(*d*), therefore, represents the normal output of the load control flip flop 36 when character 2 is selected on the keyboard 30, and the recording medium has rotated until coincidence in the count between the keyboard register 28 and the disc position register 22 has been attained and a character start strobe pulse initiates operation of the load control flip flop 36. Thus, the signal representing character #2 is read out of the dictionary track, passing through the amplifier 78, the dictionary decoder 76 and the "and" gate 74. The NRZ signal (not shown) from the dictionary decoder 76 impressed on the "and" gate 74 is sampled by the write strobe pulses shown in FIG. 4(*e*). The sampled signal then passes through the "or" gate 84 into the register write encoder 86. When the toggling signals shown in FIG. 4(*g*) (which signals are the output of the write strobe generator 20 of FIG. 3) are impressed on the register wrtie encoder 86, that element changes from whichever stable state it happened to be in to its opposite state thus producing that portion of the Ferranti waveform shown in FIG. 4(*h*) bracketed by the left hand gate of FIG. 4(*d*). Upon conclusion of such gate, "and" gate 74 is disabled and "and" gate 94 is enabled. Therefore, the signal which was just recorded in Ferranti form on the register track is read therefrom, passed through amplifier 90 and register read track decoder 92 (where it is converted to NRZ form, not shown) sampled by the pulse from the write strobe generator 18 at the "and" gate 94 and then passed through the "or" gate 84 and the register write encoder 86, to be recorded again in Ferranti form on the register track. The double headed arrow adjacent to FIG. 4(*i*) (which figure represents the signal read from the register track) is indicative of the fact that the position of the reading head adjacent to the register track is adjustable with respect to the writing transducer adjacent to such track. It follows, then, that any delay resulting from the decoding and encoding of the signals in the register track loop may be compensated by adjusting the register reading and writing heads with respect to each other. Thus, the finally recorded signals on the register track are in Ferranti waveform, in phase with the waveform selected from the dictionary track and represent a selected signal train repetitively recorded. In other words, the signal train corresponding to character 2 is repetitively recorded on the register track until that track is filled.

FIG. 4(*j*) represents the gate generated by write enable flip flop 66 when the recording medium rotates into position to allow transfer of a signal train from the register track to the display track. As noted in connection with the explanation of FIG. 3, the write enable gate is formed when:

(1) the comparator 68 indicates coincidence of the count on the disc position register 22 and the location counter register 70; a complementary gate output is obtained from the register flip flop 62; and, a character start strobe pulse occurs.

The trailing edge of the gate from write enabling flip flop 66 is fixed by the occurrence of a complementary output from the comparator 68 (indicating non-coincidence between the count on the disc position register 22 and the location counter register 70). The trailing edge of the gate from the write enabling flip flop 66 is shaped in appropriate circuitry (not shown) to produce an operation complete signal shown in FIG. 4(*l*), indicating that a signal train, FIG. 4(*k*), has been transferred from the register track to the data display track. The operation complete pulse is passed through "and" gate 72 to the points marked "T" on the location counter register 70 and to the keyboard register 28. The count on the keyboard register 28 and the keyboard register filled stage are cleared by the pulse "T," while the count on the location counter register 70 is advanced by one count by such pulse. Consequently, until a new character is inserted in the keyboard register 28 by actuation of the keyboard 30, it is impossible for coincidence between the count on the keyboard register 28 and the disc position register 22 to be attained to enable the write enabling flip flop 66 through operation of the register control flip flop 62. This, in turn, means that the recirculating signal out of the register write encoder 86 may be transferred to the display track through the gated amplifier 38 only once regardless of the length of time between entry of characters on the keyboard 30. FIG. 4(*k*), then, represents the signal transferred on the display track, the first and only time the condition required for transfer exist during operation of the illustrated system. That is, the signal train in the dictionary track representing character 2 has been transferred to the display track in the position thereon corresponding to the position of character #1 in the dictionary track. If, however, the process is repeated to select the signal train representing character #1 (by actuating the keyboard 30) from the dictionary track and to transfer such a signal train to the register track, the first open position on display track for insertion of the signal train corresponds with the position of character #2 on the dictionary track. This is so in the illustrated case since, as noted above, the location counter register 70 is advanced by one count by the first operation complete pulse, coincidence between the count on the disc position register 22 and the location counter register 70 determines the sector on the display track to which a signal train will be transferred.

FIG. 4(*m*) represents the output of the display track read decoder 98 and FIG. 4(*n*) represents sampled portions of the waveform shown in FIG. 4(*m*). As may be seen in FIG. 3 the output of the read strobe generator 80 is used to derive the pulses shown in FIG. 4(*n*) from the waveform shown in FIG. 4(*m*). The pulses shown in FIG. 4(*n*) are passed through the "and" gate 100 and the buffer amplifier 102 of FIG. 3 to the cathode ray tube 104.

FIG. 4(*o*) represents the vertical sweep gate waveform derived from the vertical sweep gate generator 110 of FIG. 3 under the control of the frequency divider 108. The waveform shown in FIG. 4(*o*) consists of four consecutive gates each spaced from the preceding gate by a small amount. The number and spacing of the gates is of course dependent upon the exact division accomplished by the frequency divider 108 and the manner in which such frequency divider is periodically inhibited. In any event, however, it may be seen that the gates shown in FIG. 4(*o*) are locked in phase with respect to the clock track and that the pulses shown in FIG. 4(*n*) must occur during the time that one of the vertical sweep gates is opened. FIG. 4(*p*) represents the output of the inverter 136 and is simply the inverse of the vertical sweep gate waveform of FIG. 4(*o*). FIG. 4(*q*) represents the output of the summing amplifier 114 and is simply the sum of the vertical sweep gate waveform and the sweep generated by the vertical sweep generator 112. This waveform is of course synchronous with the waveform shown in FIG. 4(*o*).

FIG. 4(*r*) represents the output of the vertical position generator 120. The latter element is, as may be seen in FIG. 3, controlled by frequency divider 118 (which element in turn is actuated by the output of frequency divider 14). In the illustrated case, it has been assumed that there will be two characters displayed per line on the viewing screen of the cathode ray tube 104. Therefore the frequency divider 118 divides the output of the frequency divider 14 by 2. Naturally if characters were to be displayed on two or more lines on the viewing screen of the cathode ray tube 104 it would be a simple matter to change the division of the frequency divider 118 and to change the exact structure of the vertical position generator 120 so as to attain a curve having more than one step as illustrated in FIG. 4(*r*).

FIG. 4(*s*) is the waveform out of the long horizontal sweep gate generator 126. This latter element is controlled by frequency divider 130 which in turn is controlled by the output of the frequency divider 14. The division accomplished by frequency divider 130 is determined by the number of characters desired per line on the viewing screen of the cathode ray tube 104. In the illustrated case, since there are two characters per line, the frequency divider 130 is set to divide the output of the frequency divider 14 by 2 so as to obtain the waveform shown in FIG. 4(*s*). FIG. 4(*t*) represents the output of the long horizontal sweep generator 122.

FIG. 4(*u*) represents the output of the short horizontal sweep gate generator 128. Since the short horizontal sweep gate generator 128 is actuated directly by the output of the frequency divider 14 the waveform shown in FIG. 4(*u*) repeats for each character to be displayed on the viewing screen of the cathode ray tube 104. FIG. 4(*v*) represents the output of the short horizontal sweep generator 124.

It is obvious that the various gates and sweep waveforms described in connection with the generation of horizontal sweeps are synchronized with the vertical sweep gate and sweeps and also with the signal shown on FIG. 4(*n*). Thus, in the illustrated case, signals appearing in positions 1 and 2 of the display track are displayed on one line of the viewing screen of the cathode ray tube 104 and signals appearing in positions 3 and 4 are displayed on another. It will also be observed that the cursor pulses out of "and" gate 134 are possible only during the period between vertical sweeps, since such pulses pass through "and" gate 34 only when the tops of the inverted vertical sweep gates shown in FIG. 4(*p*) and a strobe pulse from the write strobe generator 18 occur simultaneously. It should also be noted that at the time of occurrence of a cursor pulse the negative pedestal shown on FIG. 4(*q*) is applied to the vertical deflection plates of the cathode ray tube 104. It follows then that the cursor pulses must appear as a series of pulses underlining the position of a character on the viewing screen.

Figure 5:
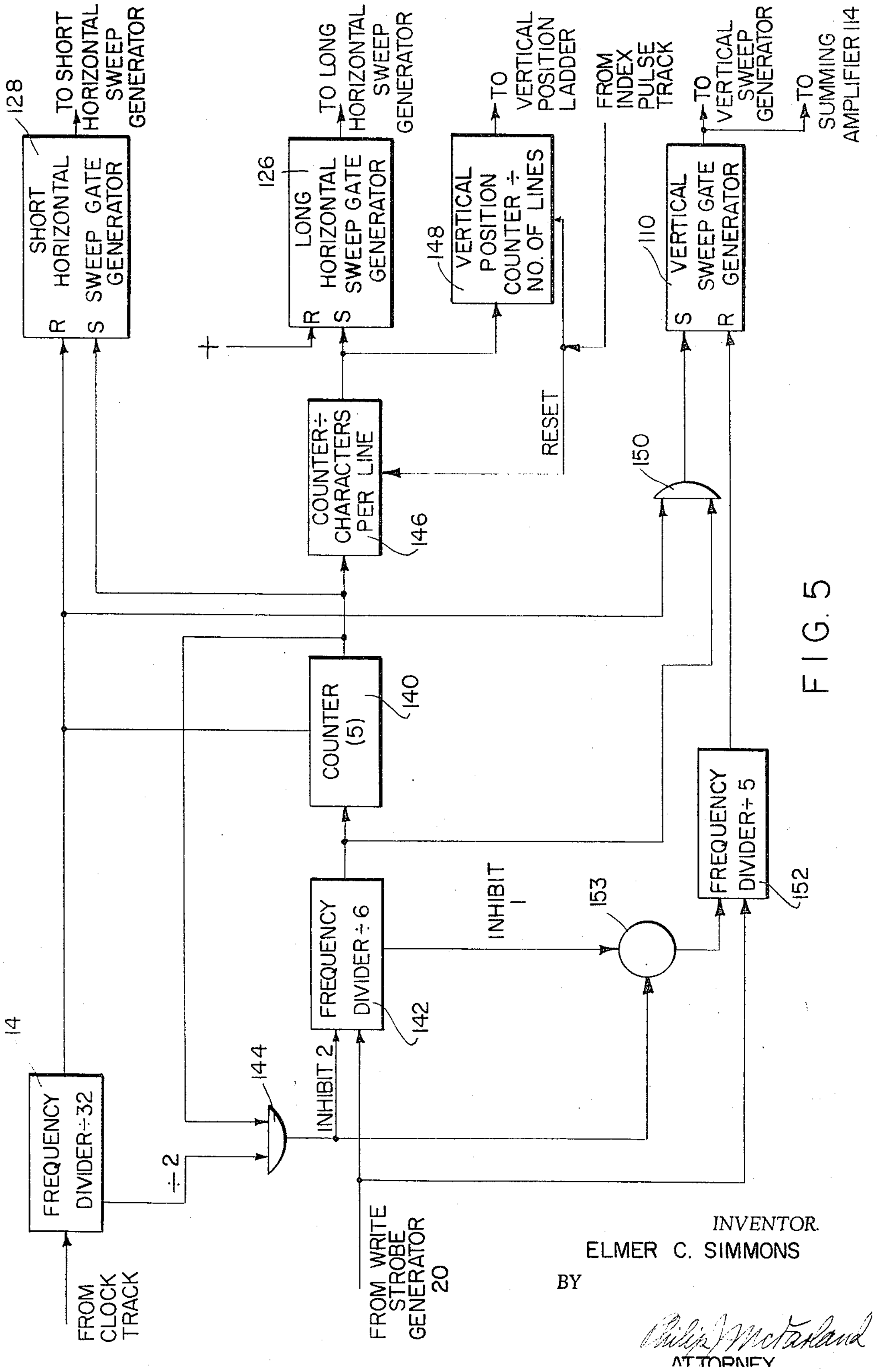
FIG. 5 is a block diagram of alternative sweep control circuits which may be substituted for the sweep control circuits of FIG. 3 to provide more positive and yet more flexible sweep control signals.

While the sweep generating circuits illustrated in FIG. 3 and described hereinbefore are sufficient for a clear understanding of my inventive concepts, it will be obvious that more sophisticated sweep control circuits would be required if complex characters are to be displayed. The circuits shown in FIG. 5 may easily be substituted for the corresponding portions of the sweep generating circuits illustrated in FIG. 3 to provide means for displaying practically any character. Thus, let it be assumed that each character is to be displayed on a 5 x 5 matrix on the viewing screen of the cathode ray tube 104 and that the signal train representing each character occupies a portion of the sector of the dictionary track included between 32 consecutive clock pulses. It then is possible, using the circuits shown in FIG. 5, to display complicated characters and, at the same time, to interleave cursor signals and control signals with the character forming signal trains.

With the foregoing in mind, it is obvious that frequency divider 14 may be replaced by frequency divider 14′ to divide the frequency of the clock pulses by 32 instead of by 5. The output of the frequency divider 14′ is led directly to one input of a short horizontal sweep gate generator 128′, here a flip flop. The second input to the short horizontal sweep gate generator 128′ is derived from a counter 140 actuated by a frequency divider 142. The latter element, in turn, is actuated by a frequency divider 142. The latter element, in turn, is actuated by the output of the write strobe generator 20 and is arranged so as to normally divide that output by 6. After every fifth output pulse from the counter 140, an enabling signal is impressed on an "and" gate 144. This enabling signal is terminated when the counter 140 is reset by the next following output signal from the frequency divider 14′. "And" gate 144, therefore, passes an inhibiting signal derived from the ÷2 stage of the frequency divider 14′ to render frequency divider 142 insensitive to the 31st and 32nd pulses from write strobe generator 20. The output of the short horizontal sweep gate generator 128′, therefore, is a gate opening when an output signal from the frequency divider 14′ indicates the start of a signal train representing a character and ending when the output of the counter 140 indicates that approximately 30/32 of the period between output signals from the frequency divider 14′ has elapsed.

A long horizontal sweep gate generator 126′, here a flip flop, is normally in its set condition and is periodically changed to its reset condition by a signal from a counter 146 actuated by the output of the counter 140. Thus, if the counter 146 is set so as to divide the output of the counter 140 by the number of characters desired to be displayed per line on the viewing screen of the cathode ray tube 104, the long horizontal sweep gate generator 126′ gates on the long horizontal sweep generator 122 (shown in FIG. 3) for the period required to display the desired number of characters on a line on the viewing screen of the cathode ray tube 104. The output of the counter 146 is also led to a vertical position counter 148, which latter counter is set to divide the output of the counter 146 by the number of lines desired to be displayed on the viewing screen of the cathode ray tube 104. The output of the vertical position counter 148 is led to a ladder of any known type so as finally to produce the desired positioning signal for application to the differential amplifier 116 in place of the signal marked "V.P." on FIG. 3. The counter 146 and the vertical position counter 148 are periodically reset by a signal from the index track as shown. Thus, synchronism between operation of the long horizontal sweep gate generator 126 and the vertical position counter 148 is ensured. The vertical sweep gate generator 110′, here a flip flop, is arranged so as to provide five vertical sweep gates per character. Each such gate is appropriately positioned so as to permit interlacing of cursor signals and control signals with the signal train generating a character on the viewing screen of the cathode ray tube 104. The vertical sweep gate generator 110′ is periodically set, through an "or" gate 150, by either an output pulse from the frequency divider 14′ or an output signal from the frequency divider 142. The vertical sweep gate generator 110′ is reset by the output of a frequency divider 152. The latter element, when not inhibited, divides (by 5) the output signals from the write strobe generator 20 to produce reset signals for the vertical sweep gate generator 110′. After every fifth pulse from the write strobe generator 20, an inhibiting signal, derived by connection to an appropriate interstage point on the frequency divider 142 through a buffer amplifier 153. Further, the frequency divider 152 is inhibited by the output signal from the "and" gate 144 through the same buffer amplifier 153. Consequently, since there are, in the case now being discussed, 32 write strobe generator pulses (synchronized with the clock pulses) between each character start pulse, the vertical sweep gate generator 110′ continuously produces "on" gates bracketing the intervals between the first and fifth, the sixth and eleventh, the twelfth and seventeenth, the eighteenth and twenty-third and the twenty-fourth and twenty-ninth pulses out of the write strobe generator 20. The character forming signal trains occur, for reasons given hereinbefore, only during the intervals in which the vertical sweep gate generator 110′ produces "on" gates. It follows then, since the intervals between the fifth and sixth, eleventh and twelfth, seventeenth and eighteenth, twenty-third and twenty-fourth, and twenty-ninth and thirty-second pulses out of the write strobe generator 20 are periods of "off" gates, that such intervals may be utilized. That is, cursor signals and/or control signals may be inserted, as described elsewhere herein, in the last mentioned intervals.

It will be noted that the cursor illustrated and described in connection with FIGS. 3 and 4 may be placed at any position in the display on the viewing screen of the cathode ray tube 104. While such positioning is normally very useful in that it gives a visual indication of the position on the viewing screen of the cathode ray tube 104 into which the next signal taken out of the dictionary track is to be inserted (thereby allowing correction or updating of individual signals on the display track) such operation is not always desired. For example, when it is desired to display a form having variable and invariable portions, as for example a format such as the following:

NAME ______________ ADDRESS ____________
AGE ______________

Figure 6:
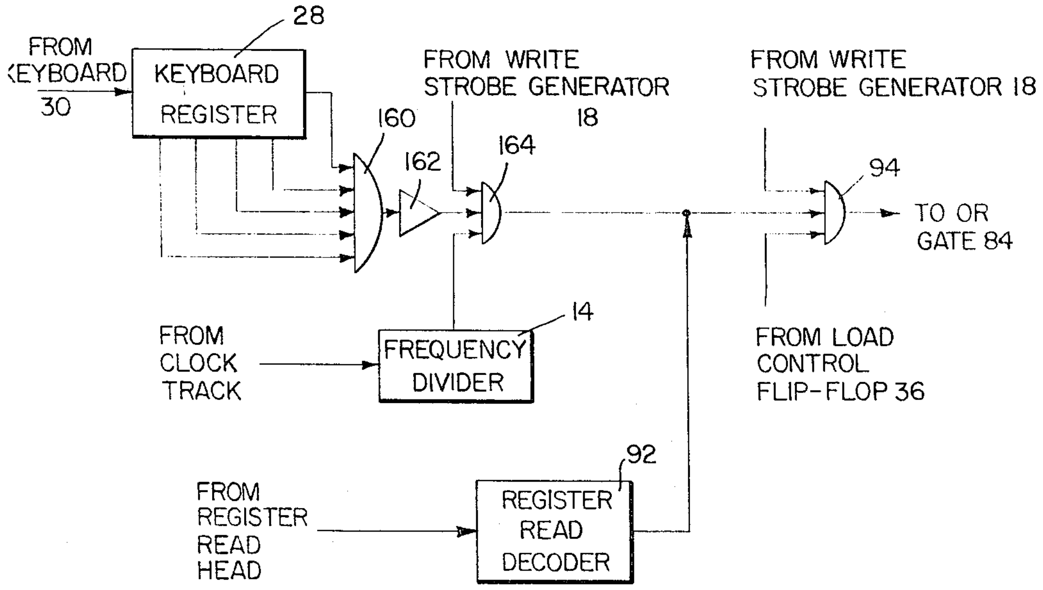
FIG. 6 is a block diagram of apparatus for interleaving control signals with the character forming signal trains of the system of FIG. 3.
Figure 7:
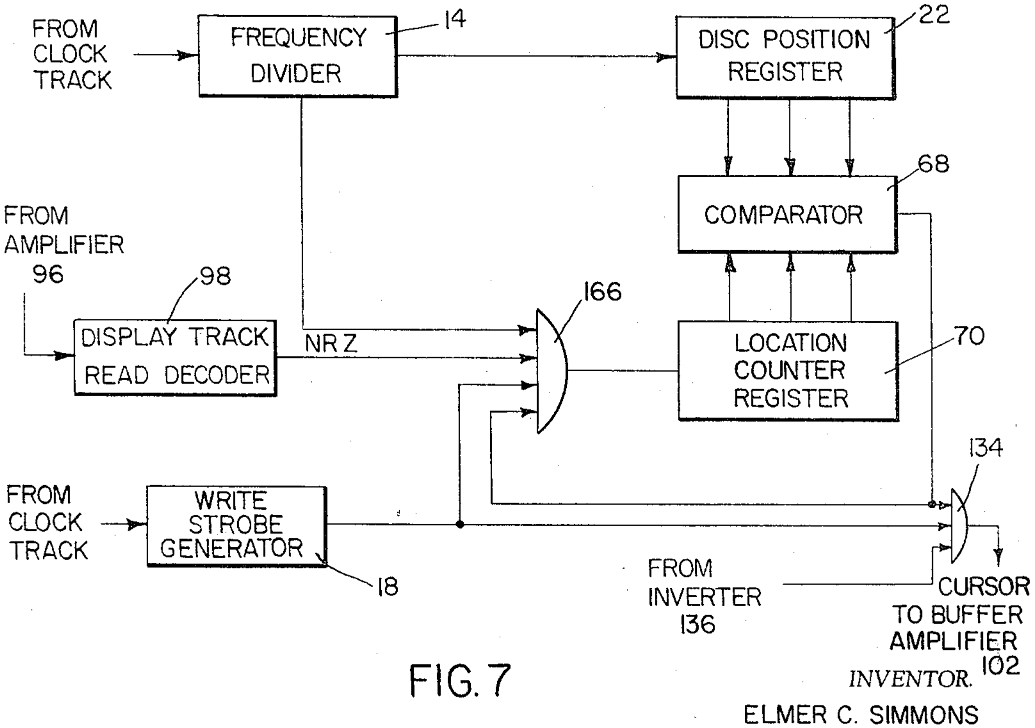
FIG. 7 is a block diagram of apparatus responsive to control signals produced by the apparatus of FIG. 6.

(where information is to be inserted only in positions indicated by the dashes) the circuits illustrated in FIGS. 6 and 7 are preferred.

Before considering FIGS. 6 and 7 in detail, it should be noted that only the elements which are required to interleave a control signal with character forming signal trains are shown. Switches or connections required to incorporate the illustrated elements into the system of FIG. 3 will be obvious on comparison of FIG. 3 with FIGS. 6 and 7 and have been eliminated to simplify the figures and their explanation.

Referring now to FIG. 6, it is seen that stages of the keyboard register 28 are connected to an "and" gate 160. The "and" gate 160 and the various stages of the keyboard register 28 are so arranged that a high level signal is obtained at the output of the "and" gate 160 only when a selected character, as a dash, is entered on the keyboard 30. The output of the "and" gate 160 is led to an inverter 162 and thence to an "and" gate 164. Consequently, the latter "and" gate is enabled whenever any character except the selected character is inserted in the keyboard 30. An appropriate stage of the frequency divider 14 provides a second enabling signal to the "and" gate 164 when the count of clock track pulses indicates that the proper position for interleaving a control signal in a character forming signal train has been reached. It may be seen, then, that when the "and" gate 164 is enabled by coincidence of signals from inverter 162 and frequency divider 14, the next following pulse from the write strobe generator 18 is passed therethrough into the recirculating signal train in the register loop. It follows, then, that a composite signal train containing both display information and a control signal is recirculated in the register loop and finally transferred to the data display track.

The circuit shown in FIG. 7 is connected by appropriate switches or connections (not shown) to the indicated points of the system of FIG. 3 when the control signal of FIG. 6 is to be used to limit insertion of characters to particular areas of a format. Let it be assumed that the composite signal train for each character (except a dash) on the display track includes a "one" immediately after the character forming signal train. (Such a "one" is, of course, prevented from brightening the viewing screen by operation of the "and" gate 100.) The composite signal train from the display track is passed through amplifier 96 and the display track read decoder 98 to an "and" gate 166. The "and" gate 166 is enabled by coincidence of signals from frequency divider 14 and comparator 68. These two signals represent, respectively, position of the control signal in the composite signal train and coincidence between the count on the disc position register 22 and the location counter register 70. The output pulse from the write strobe generator 18 occurring during such coincidence samples the composite signal train to provide a pulse out of the "and" gate 166 whenever the control signal in the composite signal train from the display track read decoder is a "one." The output of the "and" gate 166 is led to the location counter register 70. (The count on the location counter register 70 is in this mode of operation determined by pulses out of the "and" gate 166 rather than by either the pulses designated "T" or the manual set control of FIG. 3.) Consequently, immediately after a character (other than a dash) is formed on the viewing screen of the cathode ray tube 104, a control pulse is applied to the location counter register 70 to advance its count by one. The change in the location counter register 70, in turn, causes the output of the comparator 68 to bracket the next following composite signal train out of the display track read decoder 98, thereby causing the circuit to sample the control signal in that composite signal train. The count on the location counter register 70, therefore, keeps advancing until a "zero" control signal (indicating a dash) is encountered. Further advance of the count on the location counter register 70 (other than by operation of the manual control thereof) cannot occur until a character other than a dash is inserted in the keyboard register 30. It will be observed that, in the illustrated circuit, cursor pulses which are normally interleaved with the character-forming signal train are not inhibited. That is, the first time a character (other than a dash) is formed on the viewing screen of the cathode ray tube 104 cursor marks, if appropriate, will also be formed. Since, however, the gate out of the comparator 68 steps to bracket the position of the next following character as soon as a control signal is received, such cursor marks are not repetitively formed. Consequently, cursor marks adjacent to any character except a dash are visible only as a blur which soon disappears.

Figure 8:
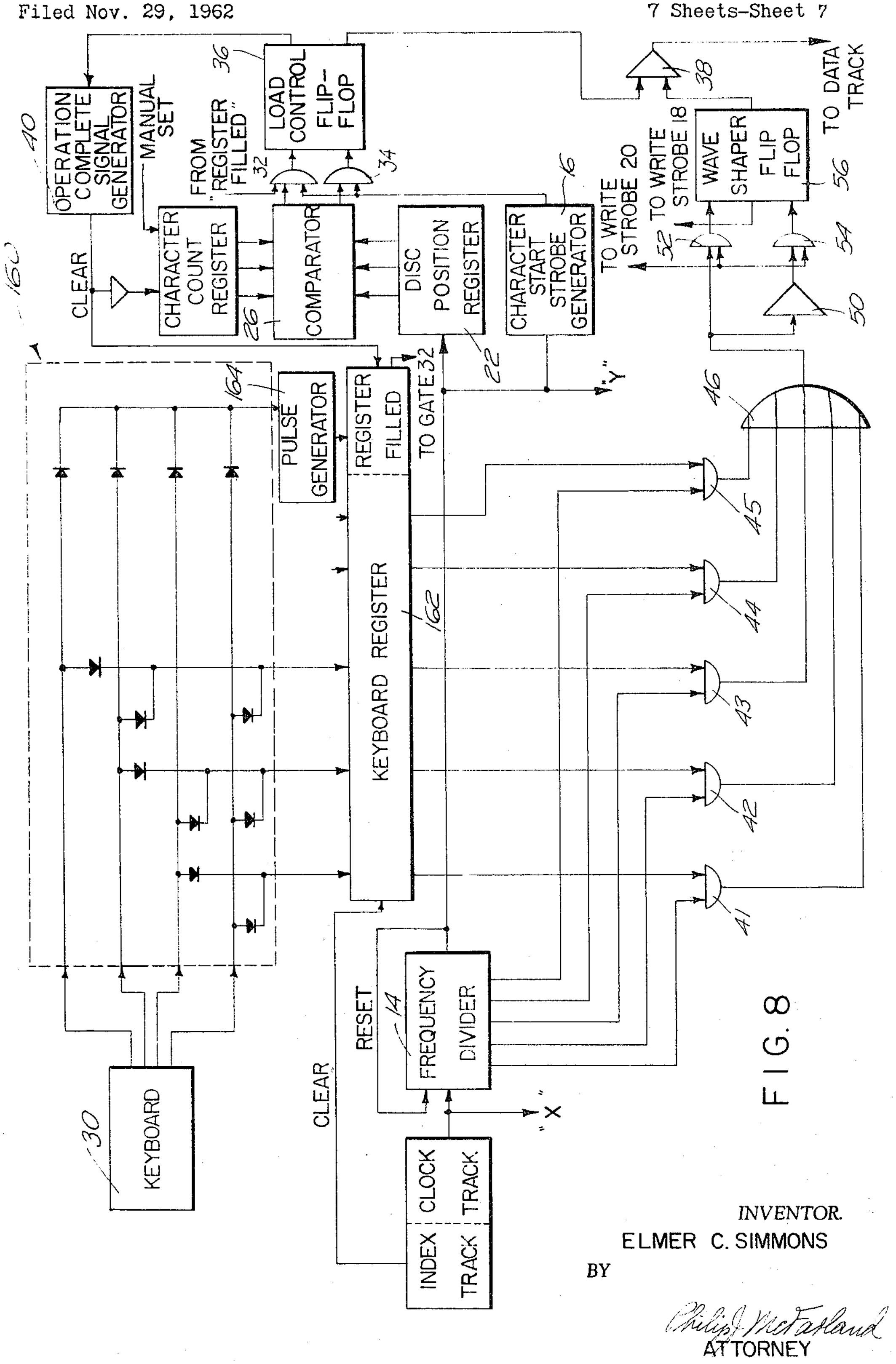
FIG. 8 is a block diagram of an alternative system according to the invention.

Referring now to FIG. 8 an alternative embodiment of my invention is shown, the embodiment being adapted to recording of signal trains corresponding to characters to be formed on the viewing screen of a cathode ray tube directly on a display track of a recording medium. It is noted that the embodiment of the invention shown in FIG. 8 partakes of many of the characteristics of the writing apparatus shown in FIG. 1 and the system shown in FIG. 3. For this reason elements in FIG. 8 which are similar to elements in FIGS. 1 and 3 are correspondingly numbered.

In FIG. 8 a keyboard 30 is connected to an encoder 170. As may be seen the encoder 170 may be a diode matrix energized by selection of a selected key on the keyboard 30. For example, if the binary number 00100 is to be inserted into the keyboard register 28', the selected key on the keyboard 30 would energize the line into the encoder 170 labeled "character one," thus changing the state of the third stage of a keyboard register 28' to a "one," leaving the other stages "zero." If the binary number 01100 is to be inserted into the keyboard register 28', then the selected key on the keyboard 30 would energize the line labeled "character two." If the binary number 11000 is to be inserted in the keyboard register 28' and the actuated key on the keyboard 30 would energize the line labeled "character three" and if the binary number 11100 is to be entered into the keyboard register 28' the actuated key on the keyboard 30 would energize the line labeled "character four." In addition, regardless of which key is actuated on the keyboard 30, a signal is passed through the encoder 170 to a pulse generator 172, which element in turn actuates a register filled stage in the keyboard register 28'. The output of the various stages of the keyboard register 28' is a parallel representation of a selected binary number. The length of the selected binary number, i.e. the number of digits, may be varied within wide limits by changing the number of stages in the keyboard register 28' and the arrangement of the encoder 170. For example, a 32 digit number may easily be accommodated. The state of each stage in the keyboard register 28' is sampled by connecting each stage to an "and" gate 41, 42, 43, 44, 45, as shown. The last mentioned "and" gates are sequentially enabled by successive signals from interstage points in the frequency divider 14, as shown. The output of each of the "and" gates 41, 42, 43, 44, 45 is fed to an "or" gate 46. The output of the "or" gate 46 then is a serial representation of the binary number stored in the keyboard register 28', the position of each digit of such number being determined by the sampling sequence of the interstage points in the frequency divider 14 and the state of the corresponding stages of the keyboard register 28'. Changes in the state in the interstage point of frequency divider 14 are, of course, in turn locked to the clock pulses. Sampled portions of the output signal of the "or" gate 46 are led through "and" gate 48, inverter 50 and "and" gate 52 to a wave shaper flip flop 54 in exactly the same manner as the output of the "or" gate 46 shown in FIG. 1. The output of the wave shaper flip flop 54, then, is the Ferranti form of the signal at the output of the "or" gate 46. This signal is impressed on a gated amplifier 38. The "on" gate for the gated amplifier 38 is derived in a manner which is quite similar to the manner in which the "on" gate is derived for the gated amplifier 38 of FIG. 3. That is, the output of the frequency divider 14 is led to a disc position register 22 and also to the input of a character start strobe generator 16. The count on the disc position register 22 is compared, in a comparator 26, with the count on a location counter register 70 to produce signals corresponding to those designated A, $\overline{A}$ in FIG. 3. These signals are fed respectively into "and" gate 32 to enable that gate when the count on the disc position register 22 is the same as the count on the location counter register 70. "And" gate 32 is also enabled by a high level signal from the register filled stage of the keyboard register 28' which indicates that a character has been entered in that register. When the two enabling signals are present together on the "and" gate 32, the next following character start strobe pulse out of the character start strobe generator 16 passes through the "and" gate 32 to change the state of a load control flip flop 36. When the complementary output of the comparator 26 indicates that there is no longer coincidence between the count on the disc position register 22 and the location counter register 70, "and" gate 34 is enabled so that the next following pulse from the character start strobe generator 16 resets the load control flip flop 36. The normal output of the load control flip flop 36 constitutes the "on" gate of the gated amplifier 38. The complementary output of the load control flip flop 36 is fed to an operation complete signal generator 40. The output of the operation complete signal generator 40 is connected to the register filled stage of the keyboard register 28' to return that stage to the condition it had before a character was inserted into the keyboard register 28'. The output of the operation complete signal generator 40 is also led to the location counter register 70 to advance the count on that register by a count of one each time the load control flip flop 36 is actuated. It will be noted here that the lines on FIG. 8 marked "*p*" and "*q*" are connected to the various strobe generators and sweep gate generators illustrated in FIG. 3 and that the elements illustrated in FIG. 3 for reading out signals recorded on the data display track must also be provided in a complete system. In operation, a parallel binary number representing a character forming signal train is inserted into the keyboard register 28, repetitively sampled in the gates 41 through 45, and recorded on the data display track in Ferranti form when a signal from the load control flip flop 36 indicates that the recording medium has rotated so as to present the next available space for a character forming signal.

The embodiments of the invention which have just been described represent a minimum in terms of character structure, message length and total system message capacity. It is obvious, however, that without departing from the concepts of the invention, a greater capacity may be easily attained in a practical system. Thus, it would be easy to use more than one track as a data display track on a recording medium. As a matter of fact 10 display tracks have been used in a working embodiment of the invention. Such an arrangement has the advantage of permitting the display of any one of 10 messages simply by switching from display track to display track.

For displays of still greater capacity, it is possible to store the character forming signal trains in a parallel arrangement on a plurality of display tracks. In such a configuration, all the elements of a single signal train would be read in parallel. It then is necessary to scan the parallel output signal and to generate a vertical sweep during the time in which the elements of a signal train are available. With this type of storage and a 5 x 5 character structure some of the numbers associated with a typical system may be considered. If five parallel tracks are used for storage of character forming signal trains, readout of a complete character forming signal train is accomplished in a period equal to 6 times the period required to read out a single element of a serially recorded signal train. Five-sixths of the readout period is required for generation of vertical sweeps and actual character writing. The remainder of the readout period provides time between characters for spacing or insertion of control signals. Assuming that a "Bernoulli Disk" recorder is used the following are the characteristics of such a system:

| | |
|---|---|
| Disc speed | 3600 r.p.m. |
| Bits per track | 3,000. |
| Bit rate | 180 kc. |
| Video bit rate | 900 kc. |
| Video pulse width | Approximately six tenths microseconds. |
| Characters per track | 500. |
| Character rate | 30 kc. |
| Frame rate | 60 per second. |
| Message capacity | 5. |

This means that a total of 2500 independent characters may be simultaneously displayed at the rate just described provided, of course, that five different cathode ray tubes are supplied.

The fact that control signals may be inserted in the various signal trains makes the disclosed system very flexible in operation. For example, the disclosed system may be used as a message composer. In this mode of operation a message is assembled and displayed of a cathode ray tube as described hereinbefore. Once a message has been displayed, it may be edited and the control signals may be actuated by the operator so that the signals stored on the display track may be delivered at a high speed to a data processor, or if desired at slow speed to telephone lines.

Although the described system requires that there be space between each character formed on the viewing screen of a cathode ray tube there is no inherent reason for such a requirement. That is the disclosed system may be used to generate maps or other outlines on the viewing screen of a cathode ray tube, the only limitation being those of the dot writing techniques used.

The use of a keyboard for entering information into a system contemplated by the invention is not a critical limitation. That is, the system may be used in conjunction with an output of any appropriate apparatus, as a computer, taking the place of the keyboard. It is also evident that the display element need not be a cathode ray tube of the type described. For example, if it is desired to provide overlays, it is obvious that a color tube of any known type may be used. One color representing one kind of information, as letters or numerals, and another color representing a different kind of information, as a map.

It will now be apparent to those skilled in the art that the systems described herein will meet all the stated objects of the invention and, further, that many modifications may be made to the disclosed structure without departing from the inventive concepts underlying the disclosed systems. It is felt, therefore, that the invention should not be restricted to its specifically disclosed embodiments, but rather should be limited only by the spirit and scope of the appended claims.

What is claimed is:

1. Display apparatus comprising:
(a) a recorder having a rotating recording medium with a plurality of closed tracks, at least one such track having a plurality of signal trains permanently recorded thereon, each one of said signal trains specifying character elements for forming a character;
(b) means for selecting individual ones of such plurality of signal trains and rerecording the so selected individual signal trains on a separate track of said recording medium thereby to establish a sequence of signals specifying a desired sequence of characters;
(c) an unshaped beam type cathode ray tube;
(d) means for reading back the rerecorded signals and converting them into recurrent signals for controlling the intensity of the beam of the said cathode ray tube; and,
(e) means for repetitively scanning the beam in synchronism with the rerecorded signals so as to repetitively produce groups of character elements representing the desired sequence of characters on the screen of the cathode ray tube.

2. A data display system as in claim 1 wherein:
(a) each one of the plurality of permanently recorded signal trains occupies a portion of a different one of a similar plurality of sectors of the at least one track on which such signal trains are recorded, the beginning point of each such sector being uniquely coded;
(b) the means for selecting and re-recording individual ones of such permanently recorded signal trains includes:
(1) means for successively comparing the just-mentioned uniquely coded beginning points with a first compatibly coded signal designating the sector in which the signal train desired to be selected lies and producing a first gating signal during the period in which coincidence between such two coded signals first occurs;
(2) means for transferring the signal train bracketed by the first gating signal to an intermediate track on the recording medium;
(3) means for continuously re-recording the transferred signal train on a portion of a different one of a similar plurality of sectors on such intermediate track, the beginning point of each such last-named sector being uniquely coded to correspond with the beginning point of each sector of the track having the permanently recorded signal trains thereon;
(4) means for successively comparing the uniquely coded beginning points of the sectors on the intermediate track with a second compatibly coded signal designating the desired portion of the viewing screen to be energized to produce a second gating signal during the period in which coincidence between the just-mentioned coded signals first occurs; and,
(5) means for transferring the signal train on the intermediate track bracketed by the second gating signal to the separate track.

3. A display system as in claim 2 having additionally:
(a) cursor generating means, synchronized with the means for repetitively scanning the portions of the viewing screen to be energized and gated by the second gating signal, to produce a cursor signal representative of the signal train bracketed by the second gating signal; and
(b) means for mixing the cursor signal and the energizing signals for the viewing screen of the display device to produce a visual representation on such viewing screen, of the position of the next to be energized portion thereof.

References Cited by the Examiner

UNITED STATES PATENTS

| | | | |
|---|---|---|---|
| 2,911,465 | 11/1959 | Toulon | 178—6.8 |
| 2,912,493 | 11/1959 | Crooks | 178—6.8 |
| 3,037,192 | 5/1962 | Everett | 340—172.5 |
| 3,090,041 | 5/1963 | Dell | 340—324.1 |
| 3,090,944 | 5/1963 | Keilsohn et al. | 340—172.5 |
| 3,103,658 | 9/1963 | Chiang | 340—324.1 |
| 3,124,784 | 3/1964 | Schaaf et al. | 340—172 |

ROBERT C. BAILEY, *Primary Examiner.*

G. D. SHAW, *Assistant Examiner.*